US010097944B2

(12) United States Patent
Christoph et al.

(10) Patent No.: US 10,097,944 B2
(45) Date of Patent: Oct. 9, 2018

(54) SOUND REPRODUCTION FOR A MULTIPLICITY OF LISTENERS (71) Applicant: HARMAN BECKER AUTOMOTIVE SYSTEMS GMBH, Karlsbad (DE)

(72) Inventors: Markus Christoph, Straubing (DE); Craig Gunther, Salt Lake City, UT (US); Matthias Kronlachner, Regensburg (DE); Juergen Zollner, Straubing (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 0 days.

(21) Appl. No.: 15/398,139

(22) Filed: Jan. 4, 2017

(65) Prior Publication Data
US 2017/0195815 A1 Jul. 6, 2017

(30) Foreign Application Priority Data

Jan. 4, 2016 (EP) .................................. 16150043
Jun. 15, 2016 (EP) .................................. 16174534
(Continued)

(51) Int. Cl.
H04R 5/02 (2006.01)
H04S 7/00 (2006.01)
G06F 3/01 (2006.01)

(52) U.S. Cl.
CPC ............. H04S 7/303 (2013.01); H04R 5/02 (2013.01); H04S 7/301 (2013.01); G06F 3/017 (2013.01); H04S 2400/13 (2013.01)

(58) Field of Classification Search
CPC . H04R 5/02; H04S 7/301; H04S 7/303; H04S 2400/13; G06F 3/017
(Continued)

(56) References Cited

U.S. PATENT DOCUMENTS 6,741,273 B1 5/2004 Waters et al.
2007/0092099 A1 4/2007 Nakano
(Continued)

FOREIGN PATENT DOCUMENTS

EP 1662842 A1 5/2006
EP 1686830 A1 8/2006
(Continued)

OTHER PUBLICATIONS

Extended European Search Report for Application No. 16202689.2, dated Mar. 1, 2017, 7 pages.
(Continued)

Primary Examiner — Paul S Kim
(74) Attorney, Agent, or Firm — Brooks Kushman P.C.

(57) ABSTRACT

The sound reproduction includes generating from a customized audio signal an acoustically isolated sound field at a position dependent on a sound field position control signal; providing a listening position signal representing a position of a listener and a listener identification signal representing the identity of the listener; and processing the listening position signal, the listener identification signal, and an audio signal. The sound reproduction further includes controlling, via the sound field position control signal, the position of the sound field dependent on the listening position signal so that the position of the sound field is at the position of the listener; and processing the audio signal according to an audio setting dependent on the identity of the listener to provide the customized audio signal.

14 Claims, 8 Drawing Sheets (30) Foreign Application Priority Data

Nov. 21, 2016 (EP) .................................. 16199773
Dec. 7, 2016 (EP) .................................. 16202689

(58) Field of Classification Search
USPC ........................................................ 381/303
See application file for complete search history.

(56) References Cited

U.S. PATENT DOCUMENTS

2009/0304205 A1   12/2009  Hardacker et al.
2011/0038494 A1    2/2011  Graber
2016/0295340 A1* 10/2016  Baker .................... H04R 1/403

FOREIGN PATENT DOCUMENTS

| | | |
|---|---|---|
| EP | 1699259 A1 | 9/2006 |
| JP | H1127604 A | 1/1999 |
| WO | 2007113718 A1 | 10/2007 |
| WO | 2010116153 A1 | 10/2010 |
| WO | 2015076930 A1 | 5/2015 |

OTHER PUBLICATIONS

Tourbabin et al., "Optimal Real-Weighted Beamforming With Application to Linear and Spherical Arrays", IEEE Transactions on Audio, Speech, and Language Prcessing, vol. 20, No. 9, Nov. 2012, pp. 2575-2585.

* cited by examiner

801
Generating from a customized audio signal an acoustically isolated sound field at a position dependent on a sound field position control signal 802
Providing a recipient position signal representing a position of a recipient and a recipient identification signal representing the identity of the recipient 803
Processing the recipient position signal, the recipient identification signal and an audio signal 804
Controlling via the sound field position control signal the position of the sound field dependent on the recipient position signal so that the position of the sound field is at the position of the recipient 805
Processing the audio signal according to an audio setting dependent on the identity of the recipient to provide the customized audio signa

SOUND REPRODUCTION FOR A MULTIPLICITY OF LISTENERS

CROSS-REFERENCE TO RELATED APPLICATIONS

This application claims priority to EP application Serial No. 16150043.4 filed Jan. 4, 2016; EP application Serial No. 16174534.4 filed Jun. 15, 2016; EP application Serial No. 16199773.9 filed Nov. 21, 2016; and EP application Serial No. 16202689.2 filed Dec. 7, 2016 the disclosures of which are hereby incorporated in their entirety by reference herein.

TECHNICAL FIELD

The disclosure relates to sound reproduction systems and methods.

BACKGROUND

People with hearing impairments often miss out, for example, on the enjoyment of a television program or movie because they cannot understand the dialog in the program material. These impairments may be significant enough to require hearing aids, or they may be less severe and merely entail slight hearing damage or hearing loss associated with age. Regardless of the reason for the hearing loss, the enjoyment of sharing time with others can be dramatically affected. Turning the volume up can make it uncomfortable for others in the same area. Some individuals may prefer a quieter listening experience than others in the room. Turning the volume down for a single individual may not be acceptable to the rest of the people watching the movie. Therefore, a personalized sound reproduction for a multiplicity of listeners is desirable.

SUMMARY

A sound reproduction system includes a loudspeaker arrangement, a listener evaluation block and an audio control block. The loudspeaker arrangement is configured to generate from a customized audio signal an acoustically isolated sound field at a position dependent on a sound field position control signal. The listener evaluation block is configured to provide a listening position signal representing a position of a listener and a listener identification signal representing the identity of the listener. The audio control block is configured to receive and process the listening position signal, the listener identification signal and an audio signal. The audio control block is further configured to control, via the sound field position control signal, the position of the sound field dependent on the listening position signal so that the position of the sound field is at the position of the listener and to process the audio signal according to an audio setting dependent on the identity of the listener to provide the customized audio signal.

A sound reproduction method includes generating from a customized audio signal, an acoustically isolated sound field at a position dependent on a sound field position control signal, and providing a listening position signal representing a position of a listener and a listener identification signal representing the identity of the listener. The method further includes processing the listening position signal, the listener identification signal and an audio signal and controlling, via the sound field position control signal, the position of the sound field dependent on the listening position signal so that the position of the sound field is at the position of the listener. The method further includes processing the audio signal according to an audio setting dependent on the identity of the listener to provide the customized audio signal.

Other systems, methods, features and advantages will be, or will become, apparent to one with skill in the art upon examination of the following figures and detailed description. It is intended that all such additional systems, methods, features and advantages be included within this description and be protected by the following claims.

BRIEF DESCRIPTION OF THE DRAWINGS

The systems and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
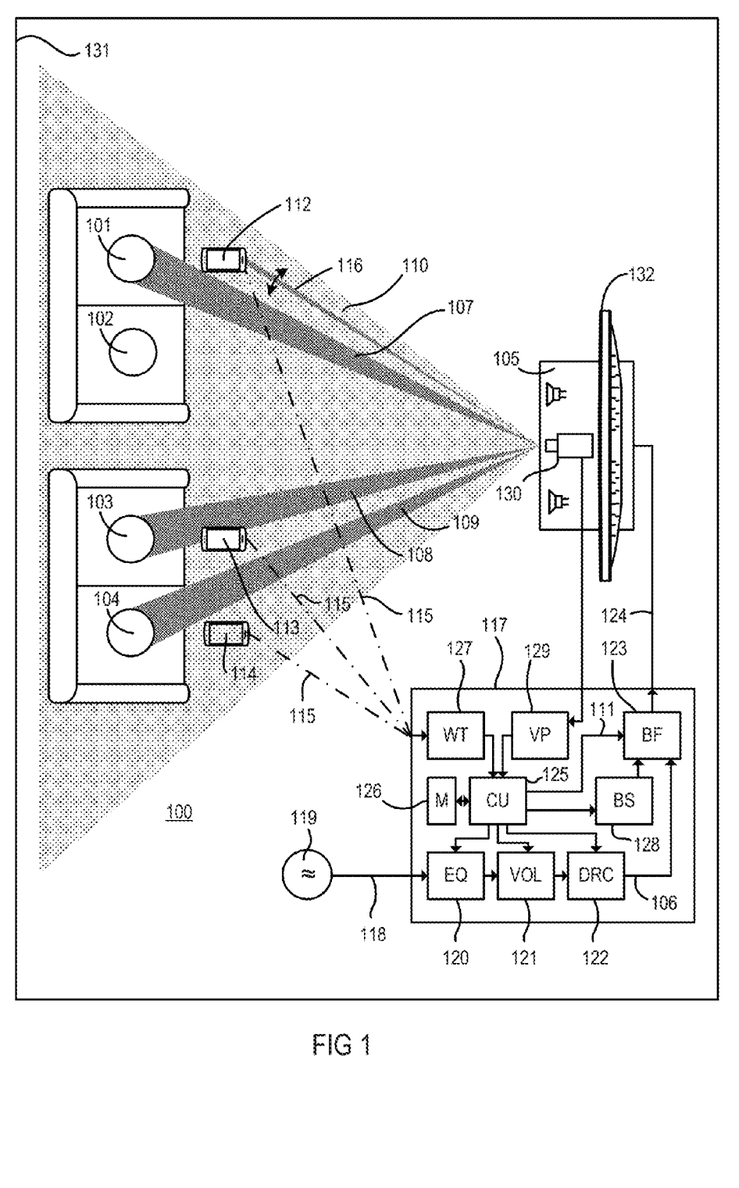
FIG. 1 is a schematic diagram illustrating an exemplary listening environment with four listening positions and a sound reproduction system that provides personalized sound reproduction for listeners located at these positions.

Referring to FIG. 1, an exemplary sound reproduction system 100 uses individually customized audio beamforming to perform personalized sound control functions such as, for example, one or more of equalization adjustment, volume adjustment, dynamic range compression adjustment etc., that adjust the loudness for individual listeners located at four listening positions 101-104. Those adjustments, in the following also referred to as audio settings, are "remembered" for future reference so that the next time the system can locate the same listener, e.g., in a room, and automatically engage his/her custom sound field, e.g., a sound zone which sends the individually adjusted audio only to him/her. This is achieved without the use of headphones or earbuds. The exemplary system shown in FIG. 1 allows for individual loudness adjustments at the four listening positions 101-104 and includes a loudspeaker arrangement 105 that generates from customized audio signals 106 three acoustically isolated sound fields, for example, sound zones 107, 108 and 109 at listening positions 101, 103 and 104, respectively, which may be sound beams directed from the loudspeaker arrangement 105 to listening positions 101, 103 and 104, and a general sound zone 110 that includes at least listening position 102. The position of the sound zones 101-104 may be steered by way of a sound zone position control signal 111.

The sound reproduction system 100 may include various blocks for performing certain functions, wherein blocks may be hardware, software or a combination thereof. For example, listener evaluation blocks 112, 113 and 114, one per listener with dedicated sound adjustment, provide wireless signals 115 that include listening position signals representing a position of each listener with dedicated sound adjustment and a listener identification signal identifying each listener designated for dedicated sound adjustment. The sound reproduction system 100 requires information that allows for determining where a particular listener is seated, for example, within a room. This may be done by using a tone that sweeps from one side of the room to the other and a microphone close to the individual listeners to identify when the sweep passes by them. Such microphones are wirelessly connected or connected by wire to other system components and may be, for example, wired stand-alone microphones (not shown in FIG. 1) disposed on or in the vicinity of the listeners, or microphones integrated in smartphones with a wireless Wi-Fi or Bluetooth connection. As a particular tone, such as an inaudible tone with a frequency of >16 kHz, sweeps the room using a separate directed sound beam 116, at least one microphone detects when the maximum volume is obtained at the microphone's position; at that point in time a particular listener can be located. Several listeners can be simultaneously located as long as they have their own clearly recognizable and assignable microphones. In the exemplary sound reproduction system shown in FIG. 1, the listener evaluation blocks 112, 113 and 114 are provided by smartphones with built-in microphones in connection with software applications (apps) that may evaluate signals from the built-in microphones, perform the listener identifications and establish the wireless connections. In another option, a remote control with built-in microphone may provide listener identification and control of the individual adjustment of the audio in the individual sound zone.

However, any other positioning systems such as indoor positioning systems (IPS) may be applied. An indoor positioning system is a system that locates objects or people inside a building using radio waves, magnetic fields, acoustic signals, or other sensory information collected by mobile devices. Exemplary techniques include camera based detection, Bluetooth location services, or global positioning system (GPS) location services. Indoor positioning systems may use different technologies, including distance measurement to nearby anchor nodes (i.e., nodes with known positions, for example, WiFi access points), magnetic positioning, or dead reckoning. They either actively locate mobile devices and tags or provide ambient location or environmental context for devices to be sensed. Indoor positioning systems may make use of various technologies including optical, radio, or even acoustic technologies, i.e., additionally processing information from other systems to cope with physical ambiguities and to enable error compensation.

Once located by the listener evaluation blocks 112, 113 and 114, the listeners can then configure the audio settings to their particular preferences. This configuration may be done with manual controls, or a remote control for the sound reproduction system 100, or with an application on a smart phone, tablet or computer. The listeners may also configure the width of the sound beam to cover the area they are seated in. The configuration can then be "remembered" by the sound reproduction system 100 and associated with the users' names or some other type of identification. In the sound reproduction system shown in FIG. 1, an exemplary audio control block 117 is designed to receive and process the wireless signals 115, particularly the listening position signal and the listener identification signal contained therein, and an audio signal 118 from an audio source 119. The audio control block 117 may then control via the sound field position control signal 111 the position of the sound field dependent on the listening position signal so that the position of the sound field is at the position of the listener, and to process the audio signal 118 according to the adjusted audio settings, each dependent on the identity of the corresponding listener, to provide the customized audio signals 106. However, instead of tracking the listener(s) and repositioning the sound beam(s), one or more fixed sound beams, for example, related to fixed listening positions, may be employed. The identity of the listener may correspond to the listening position and can be derived therefrom, or may be determined in any other suitable way.

Processing the audio signal 118 according to the individual audio settings may include at least one of adjusting the balance between spectral components of the audio signal with a controllable equalizer 120, adjusting the volume of the audio signal with a controllable volume control 121 and adjusting the dynamics of the audio signal 118 with a controllable dynamic range compressor 122. Equalization is the process of adjusting the balance between frequency components within an electronic signal. However, the term "equalization" (EQ) has come to include the adjustment of frequency responses for practical or aesthetic reasons, often resulting in a net response that is not truly equalized. Volume control (VOL) is used for adjusting the sound level to a predetermined level. Dynamic range compression (DRC) or simply compression is a signal processing operation that reduces the volume of loud sounds and/or amplifies quiet sounds by narrowing or compressing an audio signal's dynamic range. For example, audio compression may reduce loud sounds that are above a certain threshold while leaving quiet sounds unaffected. Customized audio signals 106, which are each the accordingly processed audio signal 118, are supplied to a beamforming (BF) processor 123 that, in turn, supplies beamformed signals 124 to the loudspeaker arrangement 105 to generate the beams for sound zones 107-110 and the sweeping beam that is sound field 116.

The exemplary audio control block 117 may further include a control block (CU) 125 that is connected to a memory (M) 126, a wireless transceiver (WT) 127 and a beam sweep tone generator (BS) 128. The memory 126 stores data representing identities of a multiplicity of listeners and the corresponding audio settings and, optionally, beam settings such as the beam position, beam width etc. The control block 125 selects from memory 126, based on the listener identification signals, the corresponding audio settings for processing the audio signal 118 and steers, based on the listening position signals, the direction of the corresponding sound beams. The listening position signals and the listener identification signals are generated by the wireless transceiver 127 from the wireless signals 115. The beam sweep tone generator 128 provides the signal that is used for the sweeping beam 116 to the beamforming processor 123, and is also controlled by the control block 125.

Audio control block 117 may further include a video processor (VP) 129 that is connected to a camera 130 and that allows for recognizing gestures of the listeners in connection with the camera 130 and for controlling, according to the recognized gestures, at least one of processing the audio signal 118 and configuring the respective sound zone, for example, the shape or width of the corresponding sound beam. The camera 130 is directed to an area that may include the positions of the listeners, i.e., the listening positions 101-104. From this interface the listener can use gestures to widen or narrow the sound beam and/or to move the sound beam to the left or right and/or to dynamically track movements of the listeners in the individual zones. Selecting the particular sound beam would allow the user to adjust the sound setting parameters of that sound beam. This interface may also allow a more experienced listener to configure the sound beam and related sound settings for another less experienced listener that is not familiar with the system. Additionally, a listener may be able to increase the volume within his/her "sound beam" to cover up other ambient noise, or reduce the volume of his/her "sound beam" so that he/she can have a conversation with someone sitting next to him/her, listen to voice mail on the smartphone, etc.

The exemplary sound reproduction system may be disposed in a room 131. If a particular listener leaves the room 131 the system may disable the corresponding dedicated sound beam (e.g., one of sound beams 107-109) and the ordinary sound field (e.g., provided by sound beam 110) will replace this listener's beamforming area so the next listener that occupied that particular seat would hear what is heard throughout the rest of the room 131. The ordinary sound field may also be used when no sound zones are desired. When the particular listener reenters the room 131, the corresponding dedicated sound beam can be re-enabled. Listeners have the option to adjust the configuration parameters while enjoying a program, and to discard those parameters or save them as their new personal defaults. The listener's configuration information may be stored by the system and identified, for example, by the listener's user name or face recognition data if a camera is employed. For example, the next time this listener watches a movie on a screen 132 associated with the loudspeaker arrangement 105 he/she can select his/her configuration and restore the associated customized sound beam immediately to now point at his/her current seating location. The system may identify the listener when he/she enters the room 131, for example, via an intrusion prevention system (IPS) and smartphone proximity, and load the customized configuration automatically.

As already mentioned, the sound fields may be generated by way of beamforming for example, the sound beams 107-110 and 116. Beamforming or spatial filtering is a signal processing technique used in loudspeaker or microphone arrays for directional signal transmission or reception. This is achieved by combining elements in a phased array in such a way that signals at particular angles experience constructive interference while others experience destructive interference. The improvement compared with omnidirectional reception/transmission is known as the directivity of the element.

Sound fields may also be realized using a sound field description with a technique called higher-order Ambisonics. Ambisonics is a full-sphere surround sound technique which may cover, in addition to the horizontal plane, sound sources above and below the listener. Unlike other multi-channel surround formats, its transmission channels do not carry loudspeaker signals. Instead, they contain a loudspeaker-independent representation of a sound field, which is then decoded to the listener's loudspeaker setup. This offers the listener a considerable degree of flexibility as to the layout and number of loudspeakers used for playback. Ambisonics can be understood as a three-dimensional extension of mid/side (M/S) stereo, adding different additional channels for height and depth. In terms of first-order Ambisonics, the resulting signal set is called B-format. The spatial resolution of first-order Ambisonics is quite low. In practice, this translates to slightly blurry sources, and also to a comparably small usable listening area (also referred to as sweet spot or sweet area)

The resolution can be increased and the desired sound field (also referred to as sound zone) enlarged by adding groups of more selective directional components to the B-format. In terms of second-order Ambisonics, these no longer correspond to conventional microphone polar patterns, but look like, for example, clover leaves. The resulting signal set is then called second-order, third-order, or collectively, higher-order Ambisonics (HOA). However, common applications of the HOA technique require, dependent on whether a two-dimensional (2D) and three-dimensional (3D) sound field is processed, specific spatial configurations and notwithstanding whether the sound field is measured (encoded/coded) or reproduced (decoded): Processing of 2D sound fields requires cylindrical configurations and processing of 3D sound fields requires spherical configurations, each with a regular or quasi-regular distribution of the microphones or loudspeakers, in order to keep the number of sensors necessary to realize a certain order as low as possible.

Figure 2:
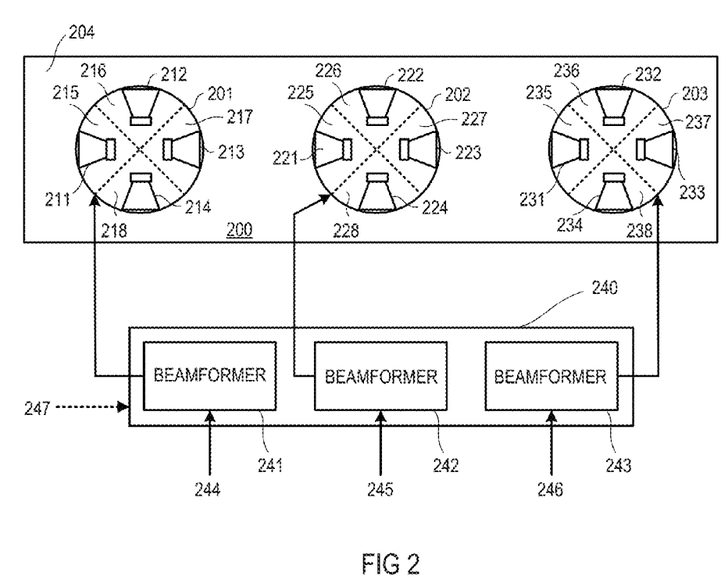
FIG. 2 is a schematic top view illustrating an exemplary soundbar based on three higher-order loudspeaker assemblies for creating a two-dimensional acoustic sound field at a desired position in a room.
Figure 3:
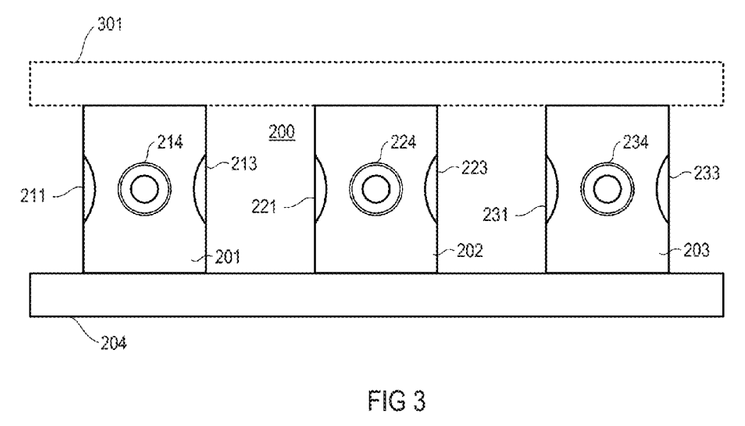
FIG. 3 is a schematic side view illustrating the soundbar shown in FIG. 2.

FIGS. 2 and 3 illustrate a sound reproduction system 200 which includes three (or, if appropriate, only two) closely spaced steerable (higher-order) loudspeaker assemblies 201, 202, 203, here arranged, for example, in a horizontal linear array (which is referred to herein as higher-order soundbar). Loudspeaker assemblies with omnidirectional directivity characteristics, dipole directivity characteristics and/or any higher order polar responses are herein referred to also as higher-order loudspeakers. Each higher-order loudspeaker 201, 202, 203 has adjustable, controllable or steerable directivity characteristics (polar responses) as outlined further below. Each higher-order loudspeaker 201, 202, 203 may include a horizontal circular array of lower-order loudspeakers (e.g., omni-directional loudspeakers). For example, the circular arrays may each include, for example, four lower-order loudspeakers 211 to 214, 221 to 224, 231 to 234 (such as common loudspeakers and, thus, also referred to as loudspeakers), the four lower-order loudspeakers 211 to 214, 221 to 224, 231 to 234 each being directed in one of four perpendicular directions in a radial plane in this example. The array of higher-order loudspeakers 201, 202, 203 may be disposed on an optional base plate 204 and may have an optional top plate 301 on top (e.g., to carry a flat screen television set). Alternatively, instead of four lower-order loudspeakers only three lower-order loudspeakers per higher-order loudspeaker assembly can be employed to create a two-dimensional higher-order loudspeaker of the first order using Ambisonics technology.

Alternative use of the multiple-input multiple-output technology instead of the Ambisonics technology allows for creating a two-dimensional higher-order loudspeaker of the first order even with only two lower-order loudspeakers. Other options include the creation of three-dimensional higher-order loudspeakers with four lower-order loudspeakers that are regularly distributed on a sphere (e.g., mounted at the centers of the four faces of a tetrahedral, which is the first representative of the, in total five, Platonic bodies) using the Ambisonics technology and with four lower-order loudspeakers that are regularly distributed on a sphere using the multiple-input multiple-output technology. Furthermore, the higher-order loudspeaker assemblies may be arranged other than in a straight line, for example, on an arbitrary curve in a logarithmically changing distance from each other or in a completely arbitrary, three-dimensional arrangement in a room.

The four lower-order loudspeakers 211 to 214, 221 to 224, 231 to 234 may be substantially the same size and have a peripheral front surface, and an enclosure having a hollow, cylindrical body and end closures. The cylindrical body and end closures may be made of material that is impervious to air. The cylindrical body may include openings therein. The openings may be sized and shaped to correspond with the peripheral front surfaces of the lower-order loudspeakers 211 to 214, 221 to 224, 231 to 234, and have central axes. The central axes of the openings may be contained in one radial plane, and the angles between adjacent axes may be identical. The lower-order loudspeakers 211 to 214, 221 to 224, and 231 to 234 may be disposed in the openings and hermetically secured to the cylindrical body. However, additional loudspeakers may be disposed in more than one such radial plane, for example, in one or more additional planes above and/or below the radial plane described above. Optionally, the lower-order loudspeakers 211 to 214, 221 to 224, 231 to 234 may each be operated in a separate, acoustically closed volume 215 to 218, 225 to 228, 235 to 238 in order to reduce or even prevent any acoustic interactions between the lower-order loudspeakers of a particular higher-order loudspeaker assembly. Further, the lower-order loudspeakers 211 to 214, 221 to 224, 231 to 234 may each be arranged in a dent, hole, recess or the like. Additionally or alternatively, a wave guiding structure such as but not limited to a horn, an inverse horn, an acoustic lens etc. may be arranged in front of the lower-order loudspeakers 211 to 214, 221 to 224, 231 to 234.

A control block 240 receives, for example, three ambisonic signals 244, 245, 246 to process the ambisonic signals 244, 245, 246 in accordance with steering information 247, and to drive and steer the higher-order loudspeakers 201, 202, 203 based on the ambisonic signals 244, 245, 246 so that at least one acoustic sound field is generated at least at one position that is dependent on the steering information. The control block 240 comprises beamformer blocks 241, 242, 243 that drive the lower-order loudspeakers 211 to 214, 221 to 224, 231 to 234. Examples of beamformer blocks are described further below.

Figure 4:
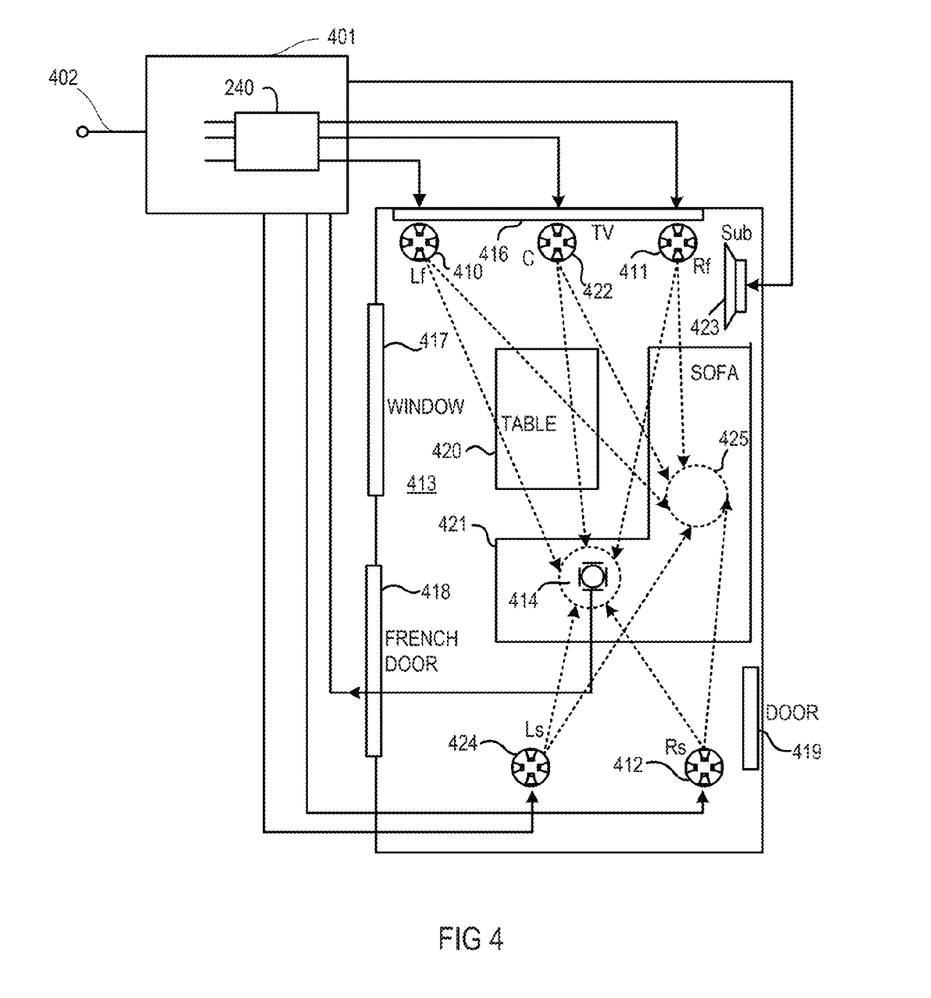
FIG. 4 is a schematic diagram illustrating another exemplary listening environment with two listening positions and a sound reproduction system that provides personalized sound reproduction for listeners located at these positions.

FIG. 4 depicts possibilities of how to use a horizontal linear array of high-order loudspeakers (referred to herein also as horizontal high-order soundbar or just high-order soundbar) in order to realize virtual sound sources in home entertainment. For example, such a linear array may be disposed under a television (TV) set for reproducing e.g. the front channels of the commonly used layout in home cinema, the 5.1 surround sound. The front channels of a 5.1 sound system include a front left (Lf) channel, a front right (Rf) channel and a center (C) channel. Arranging a single high-order loudspeaker underneath the TV set instead of the horizontal high-order soundbar would mean that the C channel could be directed to the front of the TV set and the Lf and Rf channels to its sides, so that the Lf and Rf channels would not be transferred directly to a listener sitting (at the sweet spot or sweet area) in front of the TV set but only indirectly via the side walls, constituting a transfer path which depends on numerous unknown parameters and, thus, can hardly be controlled. Therefore, in a multi-channel system with at least two channels to be reproduced, a high-order soundbar with (at least) two high-order loudspeakers that are arranged in a horizontal line allows for directly transferring front channels, for example, the Lf and Rf channels, directly to the sweet area, i.e., the area where the listener should be.

Furthermore, a center channel, for example, the C channel, may be reproduced at the sweet area by way of two high-order loudspeakers. Alternatively, a third high-order loudspeaker, disposed between the two high-order loudspeakers, may be used to separately direct the Lf and Rf channels and the C channel to the sweet area. Since with three high-order loudspeakers each channel is reproduced by a separate block, the spatial sound impression of a listener at the sweet area can be further improved. Furthermore, with each additional high-order loudspeaker added to the high-order soundbar a more diffuse sound impression can be realized and further channels such as, for example, effect channels may be radiated from the rear side of the high-order soundbar, which is in the present example from the rear side of the TV set to, for example, the rear wall where the sound provided by the effect channels is diffused.

In contrast to common soundbars in which the lower-order loudspeakers are arranged in line, higher-order soundbars provide more options for the positioning of the directional sound sources, for example, on the side and rear, so that in a common listening environment such as a living room, a directivity characteristic that is almost independent from the spatial direction can be achieved with higher-order soundbars. For example, a common side bar having fourteen lower-order loudspeakers equidistantly distributed inline over a distance of 70 cm can only generate virtual sound sources in an area of maximum ±90° (degree) from the front direction, while higher-order soundbars allow for virtual sound sources in an area of ±180°.

FIG. 4 illustrates an exemplary set-up with a higher-order soundbar including three higher-order loudspeakers 410, 411, 422. An audio control block 401 that receives one or more audio signals 402 and that includes a control block such as control block 240 shown in FIG. 2 drives the three higher-order loudspeakers 410, 411, 422 in a target room 413, for example, a common living room. At a listening position (sweet spot, sweet area) represented by a microphone array at sweet spot 414, the sound field of at least one desired virtual source can then be generated. In the target room 413, further higher-order loudspeakers, for example, a higher-order loudspeaker 424 for a left surround (Ls) channel, a lower-order sub-woofer 423 for the low frequency effects (Sub) channel, and a higher-order loudspeaker 412 for a right surround (Rs) channel are arranged. The target room 413 is acoustically very unfavorable as it includes a window 417 and a French door 418 in the left wall and a door 419 in the right wall in an unbalanced configuration. Furthermore, a sofa 421 is disposed at the right wall and extends approximately to the center of the target room 413 and a table 420 is arranged in front of the sofa 421.

A television set 416 is arranged at the front wall (e.g., above the higher order soundbar) and in line of sight of the sofa 421. The front left (Lf) channel higher-order loudspeaker 410 and the front right (Rf) channel higher-order loudspeaker 411 are arranged under the left and right corners of the television set 416 and the center (C) higher-order loudspeaker 422 is arranged under the middle of television set 416. The low frequency effects (Sub) channel loudspeaker 423 is disposed in the corner between the front wall and the right wall. The loudspeaker arrangement on the rear wall, including the left surround (Ls) channel higher-order loudspeaker 424 and the right surround (Rs) channel higher-order loudspeaker 412, do not share the same center line as the loudspeaker arrangement on the front wall including the front left (Lf) channel loudspeaker 410, the front right (Rs) channel loudspeaker 411, and low frequency effects (Sub) channel loudspeaker 423. An exemplary sweet area 414 may be on the sofa 421 with the table 420 and the television set 416 in front. As can be seen, the loudspeaker setup shown in FIG. 4 is not based on a cylindrical or spherical base configuration and employs no regular distribution. In the exemplary setup shown in FIG. 4, sweet areas 414 and 425 may receive direct sound beams from the soundbar to allow for the preset individual acoustic impressions at those sweet areas 414 and 425.

If further (higher-order) loudspeakers are used, for example, for the surround channels Ls and Rs, behind the sweet area and in front of the rear wall, or somewhere above (not shown) the level of the soundbar, the surround impression can be further enhanced. Furthermore, it has been found that the number of (lower-order) loudspeakers can be significantly reduced. For example, with five virtual sources of 4th order surrounding the sweet area, sound fields can be approximated similar to those achieved with forty-five lower-order loudspeakers surrounding the sweet area, or, in the exemplary environment shown in FIG. 4, a higher-order soundbar with three higher-order loudspeakers, which is built from twelve lower-order loudspeakers in total, and exhibits a better spatial sound impression than with the common soundbar with fourteen lower-order loudspeakers in line at comparable dimensions of the two soundbars.

Figure 5:
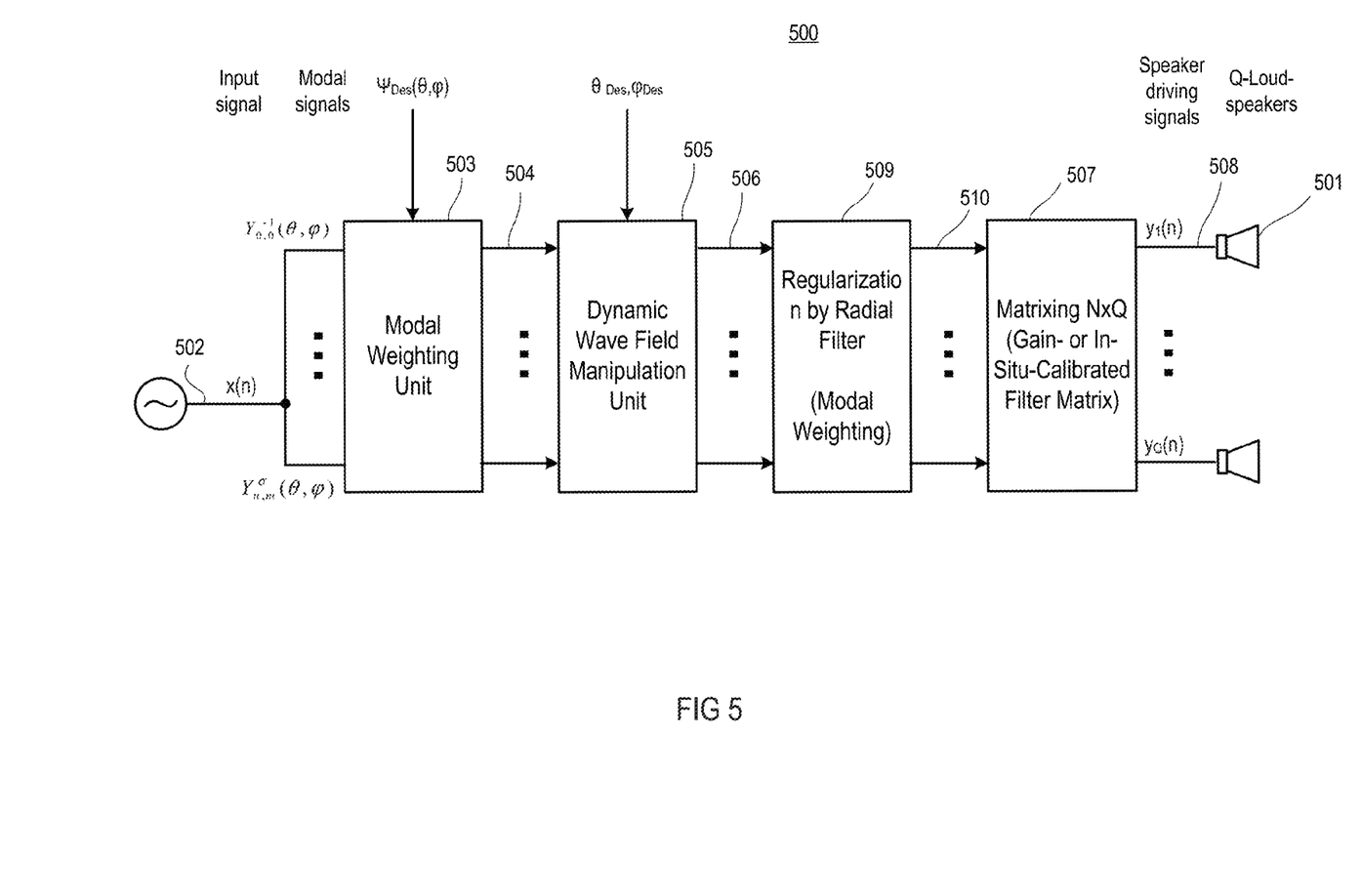
FIG. 5 is a signal flow chart illustrating an exemplary modal beamformer employing a weighting matrix for matrixing.
Figure 6:
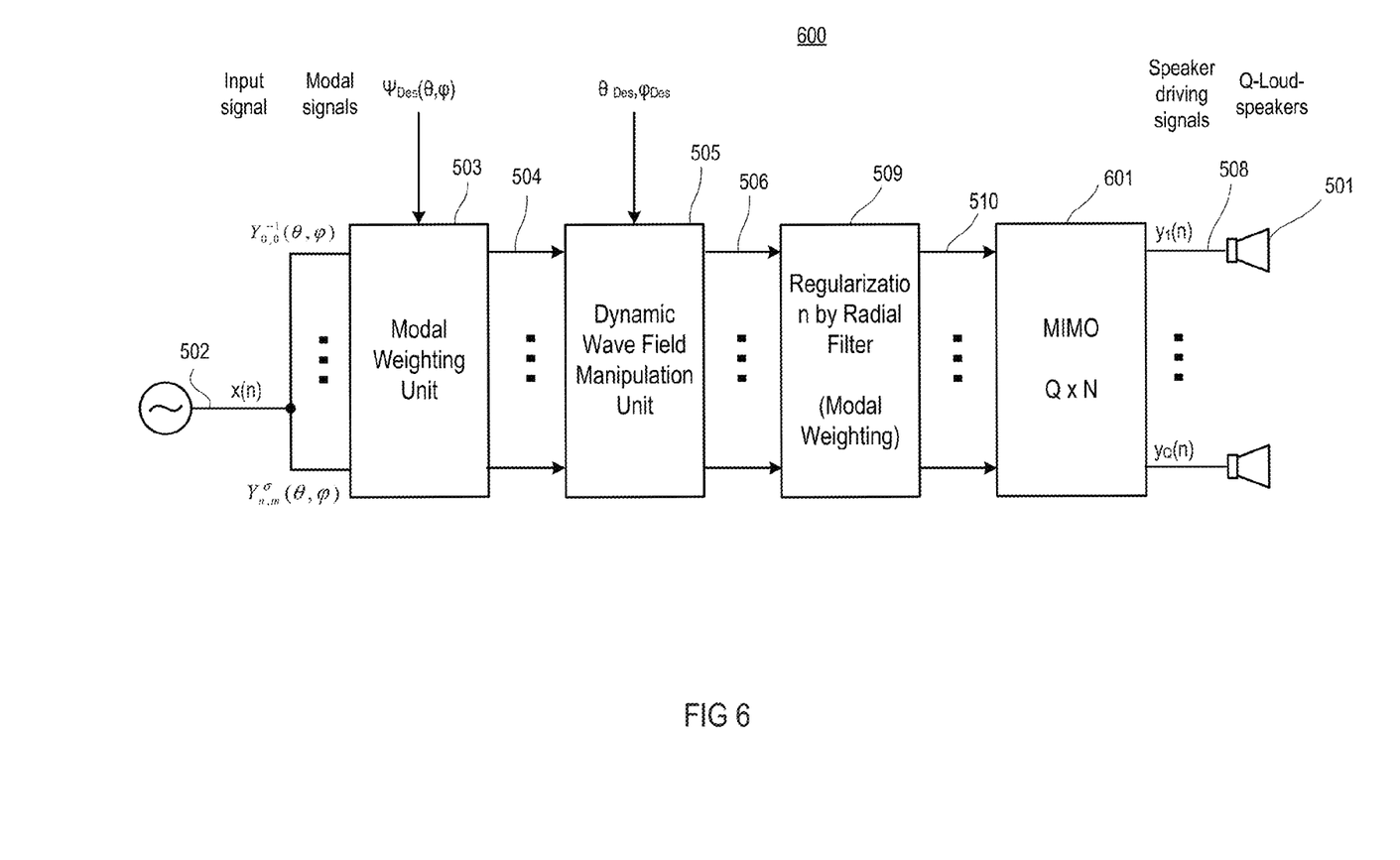
FIG. 6 is a signal flow chart illustrating an exemplary modal beamformer employing a multiple-input multiple-output block for matrixing.

For each of the higher-order loudspeakers of the soundbar (and the other higher-order loudspeakers) a beamformer block 500 or 600 as depicted in FIG. 5 or 6 (e.g., applicable as beamformers 241, 242, 243 in FIGS. 2 and 3) may be employed. The beamforming block 500 shown in FIG. 5 controls a loudspeaker assembly with Q loudspeakers 501 (or Q groups of loudspeakers each with a multiplicity of loudspeakers such as tweeters, mid-frequency range loudspeakers and/or woofers) dependent on N (Ambisonics) input signals 502, also referred to as input signals x(n) or ambisonic signals $Y_{n,m}^\sigma(\theta,\varphi)$, wherein for two dimensions N is $N_{2D}=(2M+1)$ and for three dimensions $N_{3D}=(M+1)^2$. The beamforming block 500 may further include a modal weighting sub-block 503, a dynamic wave-field manipulation sub-block 505, a regularization sub-block 509 and a matrixing sub-block 507. The modal weighting sub-block 503 is supplied with the input signal 502 [x(n)] which is weighted with modal weighting coefficients, i.e., filter coefficients $C_0(\omega)$, $C_1(\omega)$ ... $C_N(\omega)$ in the modal weighting sub-block 503 to provide a desired beam pattern, i.e., radiation pattern $\psi_{Des}(\theta,\varphi)$, based on the N spherical harmonics $Y_{n,m}^\sigma(\theta,\varphi)$ to deliver N weighted ambisonic signals 504, also referred to as $C_{n,m}^\sigma Y_{n,m}^\sigma(\theta,\varphi)$. The weighted ambisonic signals 504 are transformed by the dynamic wave-field manipulation sub-block 505 using N×1 weighting coefficients, for example, to rotate the desired beam pattern $\psi_{Des}(\theta,\varphi)$ to a desired position $\Theta_{Des},\varphi_{Des}$. Thus N modified (e.g., rotated, focused and/or zoomed) and weighted ambisonic signals 506, also referred to as $C_{n,m}^\sigma Y_{n,m}^\sigma(\theta_{Des},\varphi_{Des})$, are output by the dynamic wave-field manipulation sub-block 505.

The N modified and weighted ambisonic signals 506 are then input into the regularization sub-block 509, which includes the regularized radial equalizing filter $W_{n,m}^\sigma(\omega)$ for considering the susceptibility of the playback device Higher-Order-Loudspeaker (HOL) preventing for example, a given White-Noise-Gain (WNG) threshold from being undercut. Output signals 510) $[W_{n,m}^\sigma(\omega)\, C_{n,m}^\sigma Y_{n,m}^\sigma(\theta_{Des},\varphi_{Des})]$ of the regularization sub-block 509 are then transformed, for example, by pseudo-inverse $Y^+=(Y^TY)^{-1}Y^T$, which simplifies to $$Y^+ = \frac{1}{Q}Y^T,$$

if the Q lower-order loudspeakers are arranged at the body of the higher-order loudspeakers in a regular fashion, into Q loudspeaker signals 508 $[y_1(n), \ldots, y_Q(n)]$ by the matrixing sub-block 507 using a N×Q weighting matrix as shown in FIG. 5. Alternatively, the Q loudspeaker signals 508 may be generated from the N regularized, modified and weighted ambisonic signals 510 by a multiple-input multiple-output sub-block 601 using an N×Q filter matrix as shown in FIG. 6. The systems shown in FIGS. 5 and 6 may be employed to realize two-dimensional or three-dimensional audio using a sound field description such as Higher-Order Ambisonics.

An example of a simple ambisonic panner (or decoder) takes an input signal, for example, a source signal S and two parameters, the horizontal angle $\theta$ and the elevation angle $\varphi$. It positions the source at the desired angle by distributing the signal over the ambisonic components with different gains for the corresponding ambisonic signals W ($Y_{0,0}^{+1}(\theta,\varphi)$), $X(Y_{1,1}^{+1}(\theta,\varphi))Y(Y_{1,1}^{-1}(\theta,\varphi))$ and $Z(Y_{1,0}^{+1}(\theta,\varphi))$:

$$W = S \cdot \frac{1}{\sqrt{2}},$$

$$X = S \cdot \cos\theta \cdot \cos\varphi,$$

$$Y = S \cdot \sin\theta \cdot \cos\varphi, \text{ and}$$

$$Z = S \cdot \sin\varphi.$$

Being omnidirectional, the W channel always delivers the same signal, regardless of the listening angle. In order that it may have more-or-less the same average energy as the other channels, W is attenuated by w, i.e., by about 3 dB (precisely, divided by the square root of two). The terms for X, Y, Z may produce the polar patterns of figure-of-eight. Taking their desired weighting values at angles $\theta$ and $\varphi$(x, y, z), and multiplying the result with the corresponding ambisonic signals (X, Y, Z), the output sums end up in a figure-of-eight radiation pattern now pointing to the desired direction, given by the azimuth $\theta$ and elevation $\varphi$, utilized in the calculation of the weighting values x, y and z, and having an energy content that can cope with the W component, weighted by w. The B-format components can be combined to derive virtual radiation patterns that can cope with any first-order polar pattern (omnidirectional, cardioid, hypercardioid, figure-of-eight or anything in between) and point in any three-dimensional direction. Several such beam patterns with different parameters can be derived at the same time to create coincident stereo pairs or surround arrays. Higher-order loudspeakers or loudspeaker assemblies like those described above in connection with FIGS. 2 to 4, including beamformer blocks such as those shown in FIGS. 5 and 6, allow for approximating any desired directivity characteristic by superimposing the basic functions, i.e., the spherical harmonics.

The matrixing block 601 may be implemented as a multiple-input multiple-output system that provides an adjustment of the output signals of the higher-order loudspeakers so that the radiation patterns approximate as closely as possible the desired spherical harmonics. To generate a desired sound field at a certain position or area in the room utilizing several higher-order loudspeakers, it may be sufficient in the adaptation process to adapt only the modal weights $C_{n,m}{}^o$ of the individual higher-order loudspeakers employed, i.e., to run the adaptation directly in the wave domain. Because of this adaptation in the sound field (wave field) domain, such a process is called Wave-Domain Adaptive Filtering (WDAF). WDAF is a known efficient spatio-temporal generalization of the also known Frequency-Domain Adaptive Filtering (FDAF). Through incorporation of the mathematical fundamentals of sound fields, WDAF is suitable even for massive multiple-input multiple-output systems with highly cross-correlated broadband input signals. With wave domain adaptive filtering, the directional characteristics of the higher-order loudspeakers are adaptively determined so that the superposition of the individual sound beams in the sweet area(s) approximates the desired sound field.

To adjust or (singularly or permanently) adapt the sound reproduced by the soundbar to the specific room conditions and the specific requirements of the sweet area of the loudspeaker set-up, which includes the high-order soundbar and, possibly, other (high-order) loudspeakers, the sound field needs to be measured and quantified. This may be accomplished by way of an array of microphones (microphone array) and a signal processing block able to decode the given sound field, that, for example, form a higher-order ambisonic system to determine the sound field in three dimensions or, which may be sufficient in many cases, in two dimensions, which requires fewer microphones. For the measurement of a two-dimensional sound field, S microphones are required to measure sound fields up to the Mth order, wherein $S \geq 2M+1$. In contrast, for a three-dimensional sound field, $S \geq (2M+1)^2$ microphones are required. Furthermore, in many cases it is sufficient to dispose the microphones (equidistantly) on a circle line. The microphones may be disposed on a rigid or open sphere or cylinder, and may be operated, if needed, in connection with an ambisonic decoder. In an alternative example, the microphone array at sweet spot 414 may be integrated in one of the higher-order loudspeakers (not shown). A microphone array similar to microphone array at sweet spot 414 may be disposed at a sweet spot 425. The microphones or microphone arrays at sweet spots 414 and 425 may be used for locating listeners at the sweet spots 414 and 425.

Figure 7:
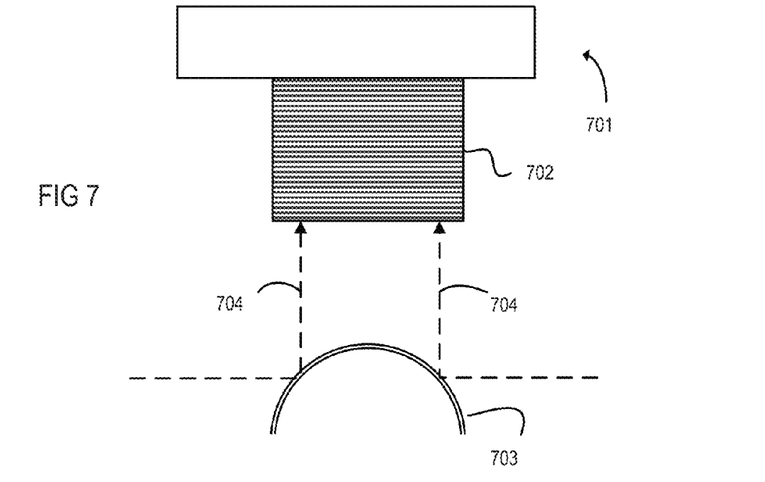
FIG. 7 is a schematic diagram illustrating an exemplary optical detector for gesture evaluation and optional listening position evaluation.

The camera 130 as shown in FIG. 1 may not only serve to recognize gestures of the listeners but also to detect the positions of the listener and to reposition the sound zones by steering the direction of the higher-order loudspeakers. An exemplary optical detector is shown in FIG. 7. As shown, a camera 701 with a lens 702 may be disposed at an appropriate distance above (or below) a mirrored hemisphere 703 with the lens 702 pointing to the curved, mirrored surface of the hemisphere 703, and may provide a 360° view 704 in a horizontal plane. For example, when such a detector is mounted, for example, on the ceiling of the room, the position of the listener can be spotted everywhere in the room. Alternatively, a so-called fisheye lens may be used (as lens 702) that also provides a 360° view in a horizontal plane so that the mirrored hemisphere 703 can be omitted.

Figure 8:
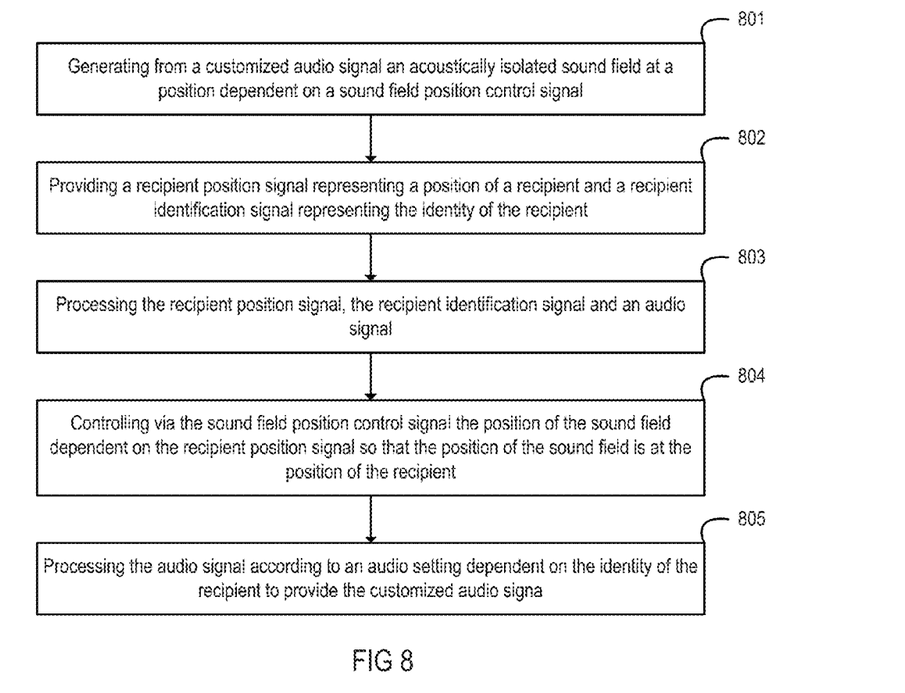
FIG. 8 is a diagram illustrating an exemplary sound reproduction method that provides personalized sound reproduction for a multiplicity of listeners.

FIG. 8 depicts an exemplary sound reproduction method in which an acoustically isolated sound field is generated from a customized audio signal at a position dependent on a sound field position control signal (procedure 801). A listening position signal representing a position of a listener and a listener identification signal representing the identity of the listener is provided (procedure 802). The listening position signal, the listener identification signal and an audio signal are processed to provide the customized audio signal (procedure 803) to control via the sound field position control signal the position of the sound field dependent on the listening position signal so that the position of the sound field is at the position of the listener (procedure 804), and to process the audio signal according to an audio setting dependent on the identity of the listener to provide the customized audio signal (procedure 805).

The techniques described above use individually customized audio beamforming to perform (basic) sound setting functions that adjust, for example, the loudness of certain frequencies for individual listeners. Those adjustments would be "remembered" for future reference so that the next time that individual sits down the system can locate that person in the room and automatically engage their customized "sound beam" that sends the adjusted audio to only that listener. This can all be achieved without the use of headphones or earbuds.

By using, for example, an array of higher-order loudspeakers (e.g., in form of a higher-order soundbar), each of them having versatile directivity, arbitrary sound fields can be approximated, even in reflective venues such as living rooms where home audio systems are typically installed. This is possible because, due to the use of higher-order loudspeakers, versatile directivities can be created, radiating the sound only in directions where no reflective surfaces exists, or deliberately making use of certain reflections if those turn out to positively contribute to the creation of a desired, enveloping sound field to be approximated. Thus, the approximation of the desired sound field at a desired position within the target room (e.g. a certain region at the couch in the living room) can be achieved by using adaptive methods, such as an adaptive multiple-input multiple-output (MIMO) system, given for example by the multiple-FXLMS filtered input least mean squared (multiple-FXLMS) algorithm, which could also operate not just in the time or spectral domain, but also in the so-called wave-domain.

Utilizing wave domain adaptive filters (WDAF) is of special interest, since this promises very good results in the approximation of the desired sound field. WDAF can be used if the recording device fulfills certain requirements. For example, circular (for 2D) or spherical microphone arrays (3D), equipped with regularly or quasi-regularly distributed microphones at the surface, may be used to record the sound field, having, depending on the desired order in which the sound field has to be recorded, respectively reproduced a minimum number of microphones that have to be accordingly chosen. However, if beamforming filters are calculated using, for example, a MIMO system, arbitrary microphone arrays having different shapes and microphone distributions can be used as well to measure the sound field, leading to high flexibility in the recording device. The recording device can be integrated in a main block of the complete new acoustic system. Thus it can be used not only for the already mentioned recording task, but also for other needed purposes, such as enabling a speech control of the acoustic system to verbally control, for example, the volume, switching of titles, and so on. Furthermore, the main block to which the microphone array is attached could also be used as a stand-alone device, for example, as a teleconferencing hub or as a portable music device with the ability to adjust the acoustic in dependence of the relative position of the listener to the device, which is only possible if a video camera is integrated in the main block as well.

Loudspeaker arrangements with adjustable, controllable or steerable directivity characteristics include at least two identical or similar loudspeakers, which may be arranged in one, two or more loudspeaker assemblies, for example, one loudspeaker assembly with two loudspeakers or two loudspeaker assemblies with one loudspeaker each. The loudspeaker assemblies may be distributed somewhere around the display(s), for example, in a room. With the help of arrays of higher-order loudspeakers, it is possible to create sound fields of the same quality, but using fewer devices as compared with ordinary loudspeakers. An array of higher-order loudspeakers can be used to create an arbitrary sound field in real, for example, reflective environments.

Figure 9:
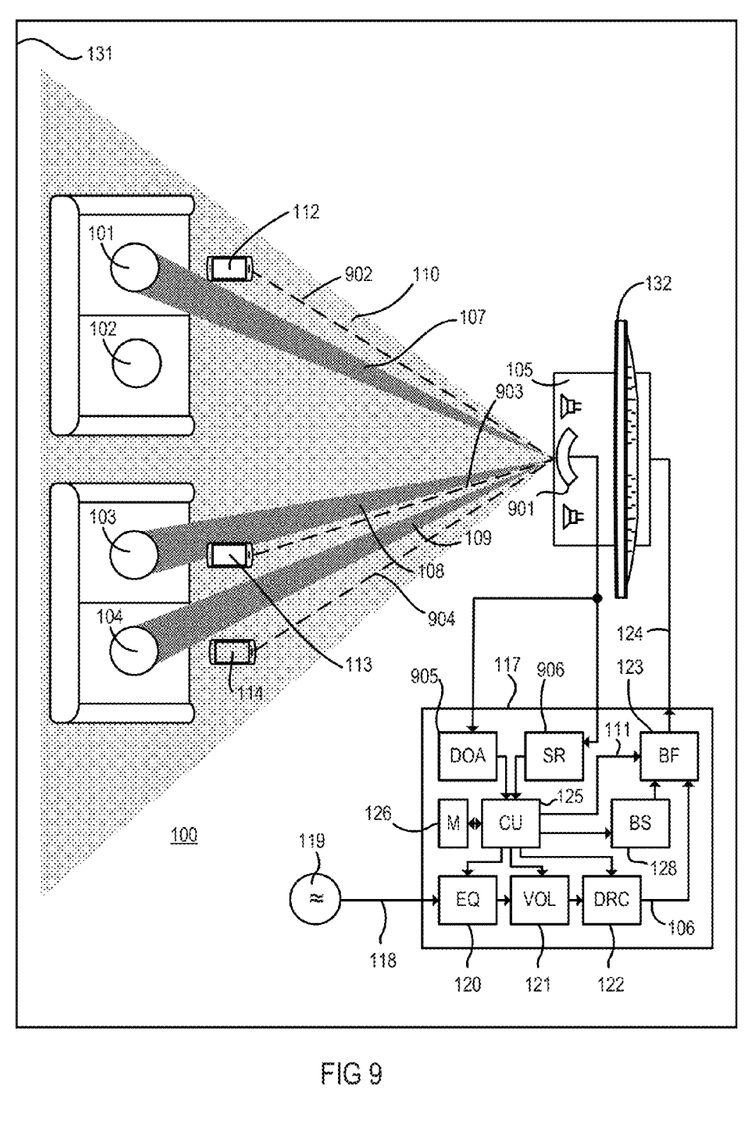
FIG. 9 is a schematic diagram illustrating modifications of the exemplary listening environment shown in FIG. 1.

Referring to FIG. 9, the system shown in FIG. 1 can be altered to use as an alternative for (or in addition to) the camera 130 a microphone array 901 that is positioned, for example, at the loudspeaker arrangement 105 and is able to detect the acoustic direction-of-arrival (DOA). The loudspeaker arrangement 105 may have a multiplicity of directional microphones and/or may include (microphone) beamforming functionality. The smartphones 112, 113 and 114 may have loudspeakers that are able to send non-audible tones 902, 903 and 904 which are picked up by a microphone array 901. The microphone array 901 may be part of a far field microphone system and identifies in connection with a DOA processing block 905, which substitutes wireless transceiver 127 shown in FIG. 1, the directions from which the tones originate. The tones may further include information that allows for identifying the listener associated with the particular smartphone. For example, different frequencies of the tones may be associated with different listeners. Instead of smartphones, accordingly adapted remote control blocks may be used as well. Furthermore, the tones may also include information about the specific sound settings of the associated listener or instructions to alter the corresponding sound settings. If coupled with a speech recognition block 906, microphone array 901 allows for detecting individual listeners or listening positions if a listener talks at one of the listening positions. Thereby, if utilizing different keywords, for example, the name of the user, individually adjusted audio is available at any sound zone within the room 131. Speech recognition can further be utilized to alter the corresponding sound settings.

Figure 10:
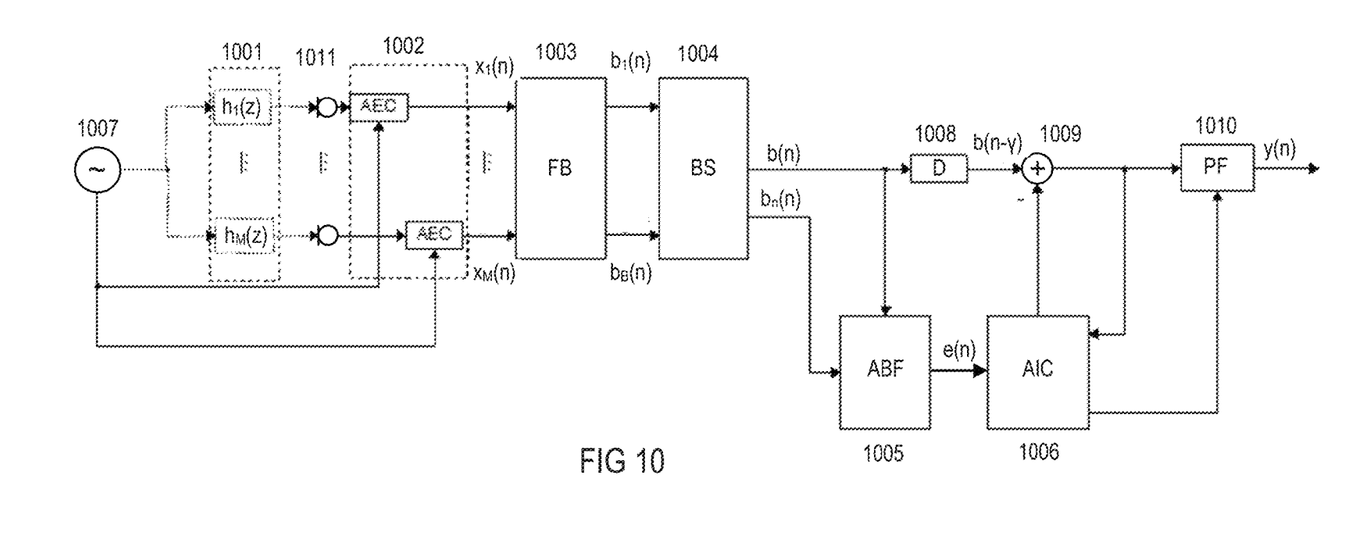
FIG. 10 is a schematic diagram illustrating an exemplary far field microphone system.

Referring to FIG. 10, in an exemplary far field microphone system applicable in the system shown in FIG. 9, sound from a desired sound source 1007 is radiated via one loudspeaker or a plurality of loudspeakers, travels through the room, where it is filtered with the corresponding room impulse responses (RIRs) 1001 and may eventually be corrupted by noise, before the corresponding signals are picked up by M microphones 1011 of the far field microphone system. The far field microphone system shown in FIG. 10 further includes an acoustic echo cancellation (AEC) block 1002, a subsequent fix beamformer (FB) block 1003, a subsequent beam steering block 1004, a subsequent adaptive blocking filter (ABF) block 1005, a subsequent adaptive interference canceller block 1006, and a subsequent adaptive post filter block 1010. As can be seen from FIG. 10, N source signals, filtered by the RIRs ($h_1, \ldots, h_M$), and eventually overlaid by noise, serve as an input to the AEC block 1002. The output signals of the fix DS beamformer block 1003 serve as an input $b_i(n)$, wherein $i=1, 2, \ldots B$, to the beam steering (BS) block 1004. Each signal from the fix beamformer block 1003 is taken from a different room direction and may have a different SNR level.

The BS block 1004 delivers an output signal $b(n)$ which represents the signal of the fix beamformer block 1003 pointing into room direction with the best/highest current SNR value, referred to as positive beam, and a signal $b_n(n)$, representing the current signal of the fix beamformer block 1003 with the least/lowest SNR value, referred to as negative beam. Based on these two signals $b(n)$ and $b_n(n)$, the adaptive blocking filter (ABF) block 1005 calculates an output signal $e(n)$ which ideally solely contains the current noise signal, but no useful signal parts anymore. The expression "adaptive blocking filter" comes from its purpose to block, in an adaptive way, useful signal parts still contained in the signal of the negative beam $b_n(n)$. The output signal $e(n)$ enters, together with the optionally, by delay (D) line 1008, delayed signal representative of the positive beam $b(n-\gamma)$ the AIC block 1006 including, from a structural perspective, also a subtractor block 1009. Based on these two input signals $e(n)$ and $b(n-\gamma)$, the AIC block 1006 generates an output signal which is, on the one hand acting as an input signal to a successive adaptive post filter (PF) block 1010 and on the other hand is fed back to the AIC block 1006, acting thereby as an error signal for the adaptation process, which also employs AIC block 1006. The purpose of this adaptation process is to generate a signal which, if subtracted from the delayed, positive beam signal, reduces, mainly harmonic noise signals, therefrom. In addition, the AIC block 1006 also generates time-varying filter coefficients for the adaptive PF block 1010 which is designed to remove mainly statistical noise components from the output signal of subtractor block 1009 and eventually generates a total output signal $y(n)$.

The description of embodiments has been presented for purposes of illustration and description. Suitable modifications and variations to the embodiments may be performed in light of the above description. The described assemblies, systems and methods are exemplary in nature, and may include additional elements or steps and/or omit elements or steps. As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. A signal flow chart may describe a system, method or software implementing the method dependent on the type of realization. for example, as hardware, software or a combination thereof. A block may be implemented as hardware, software or a combination thereof.

What is claimed is:

1. A sound reproduction system comprising:
a loudspeaker arrangement configured to generate from a customized audio signal an acoustically isolated sound field at a position dependent on a sound field position control signal;
a listener evaluation block configured to provide a listening position signal representing a position of a listener and a listener identification signal representing an identity of the listener; and
an audio control block configured to receive and process the listening position signal, the listener identification signal and an audio signal; the audio control block being further configured to control, via the sound field position control signal, the position of the sound field dependent on the listening position signal so that the position of the sound field is at the position of the listener, and to process the audio signal according to an audio setting dependent on the identity of the listener to provide the customized audio signal; and a microphone arrangement disposed at the position of the listener, wherein:

the loudspeaker arrangement is further configured to generate a sound beam sweeping an area including the position of the listener;

the listener evaluation block is wirelessly connected or connected by wire to the microphone arrangement;

the microphone arrangement is configured to pick up the sound beam when sweeping the position of the listener and to provide a corresponding microphone signal; and the listener evaluation block is further configured to evaluate the microphone signal and a corresponding beam position to provide the listening position signal and, wherein:

the microphone arrangement is further configured to provide a microphone identification signal corresponding to the identity of a specific listener; and the listener evaluation block is further configured to identify the specific listener from the microphone identification signal and to generate the corresponding listener identification signal.

2. The system of claim 1, wherein the audio control block is further configured to perform at least one of adjusting a balance between spectral components of the audio signal, adjusting a volume of the audio signal, and adjusting dynamics of the audio signal.

3. The system of claim 1 further comprising a memory configured to store data representing identities of a multiplicity of listeners and corresponding audio settings, wherein the audio control block is further configured to select, based on the listener identification signal, the corresponding audio settings for processing the audio signal.

4. The system of claim 1 further comprising a default audio setup and a default sound zone that are employed if no known listener is identified.

5. The system of claim 1 further comprising a camera connected to the audio control block and directed to an area including the position of the listener, the audio control block being configured to recognize gestures of the listener via the camera and to control according to the recognized gestures at least one of processing the audio signal and configuring a sound zone.

6. The system of claim 1 further comprising a microphone array that includes a multiplicity of microphones, wherein:

the microphone array is configured to pick up sound from the position of the listener and to provide a corresponding microphone signal; and the listener evaluation block is connected to the microphone array, the listener evaluation block being configured to evaluate the microphone signal to evaluate a direction of the listening position signal.

7. A sound reproduction method comprising:

generating from a customized audio signal, an acoustically isolated sound field at a position dependent on a sound field position control signal;

providing a listening position signal representing a position of a listener and a listener identification signal representing an identity of the listener;

processing the listening position signal, the listener identification signal, and an audio signal;

controlling, via the sound field position control signal, the position of the sound field dependent on the listening position signal so that the position of the sound field is at the position of the listener;

processing the audio signal according to an audio setting dependent on the identity of the listener to provide the customized audio signal;

disposing a microphone arrangement at the position of the listener;

generating a sound beam sweeping an area including the position of the listener;

picking up the sound beam when sweeping the position of the listener to provide a corresponding microphone signal;

evaluating the microphone signal and a corresponding beam position to provide the listening position signal providing with the microphone signal, a microphone identification signal corresponding to the identity of a specific listener;

identifying the specific listener from the microphone identification signal; and generating the corresponding listener identification signal.

8. The method of claim 7, wherein processing the audio signal according to the audio setting includes at least one of adjusting a balance between spectral components of the audio signal, adjusting a volume of the audio signal, and adjusting dynamics of the audio signal.

9. The method of claim 7 further comprising:

storing data representing identities of a multiplicity of listeners and corresponding audio settings; and selecting, based on the listener identification signal, the corresponding audio settings for processing the audio signal.

10. The method of claim 7, further comprising:

picking up sound from the position of the listener and providing a corresponding microphone signal; and evaluating the microphone signal to evaluate a direction of the listening position signal.

11. The method of claim 7, further comprising:

recognizing with a camera directed to an area including the position of the listener, gestures of the listener; and controlling, according to the recognized gestures, at least one of processing the audio signal and configuring the sound field.

12. A sound reproduction system comprising:

a loudspeaker arrangement configured to generate an acoustically isolated sound field at a position based on a sound field position control signal from a customized audio signal;

a listener evaluation block configured to provide a listening position signal indicative of a position of a listener and a listener identification signal indicative of an identity of the listener;

an audio control block configured to:

receive the listening position signal, the listener identification signal, and an audio signal;

control the position of the sound field based on the listening position signal so that the position of the sound field is at the position of the listener based on the sound field position control signal; and process the audio signal according to an audio setting based on the identity of the listener to provide the customized audio signal; and a microphone arrangement disposed at the position of the listener, wherein:

the loudspeaker arrangement is further configured to generate a sound beam sweeping an area including the position of the listener;

the listener evaluation block is wirelessly connected or connected by wire to the microphone arrangement;

the microphone arrangement is configured to pick up the sound beam when sweeping the position of the listener and to provide a corresponding microphone signal;

the listener evaluation block is further configured to evaluate the microphone signal and a corresponding beam position to provide the listening position signal, wherein:

the microphone arrangement is further configured to provide a microphone identification signal corresponding to the identity of a specific listener; and the listener evaluation block is further configured to identify the specific listener from the microphone identification signal and to generate the corresponding listener identification signal.

13. The system of claim 12, wherein the audio control block is further configured to perform at least one of adjusting a balance between spectral components of the audio signal, adjusting a volume of the audio signal, and adjusting dynamics of the audio signal.

14. The system of claim 12 further comprising a memory configured to store data representing identities of a multiplicity of listeners and corresponding audio settings, wherein the audio control block is further configured to select, based on the listener identification signal, the corresponding audio settings for processing the audio signal.

* * * * *